(12) United States Patent
Chang

(10) Patent No.: US 6,195,866 B1
(45) Date of Patent: Mar. 6, 2001

(54) METHOD FOR MAKING AN EXTRUDER SLEEVE

(75) Inventor: Shin-Fa Chang, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/198,465

(22) Filed: Nov. 24, 1998

(51) Int. Cl.⁷ .............................. B23P 11/02; B23P 13/04; B21D 39/02; B23Q 13/00
(52) U.S. Cl. ................................ 29/447; 29/463; 29/466; 29/557; 29/DIG. 19; 29/DIG. 21; 29/DIG. 38; 29/DIG. 48
(58) Field of Search ........................... 29/447, 463, 464, 29/466, 525.11, 557, DIG. 19, DIG. 21, DIG. 38, DIG. 48; 366/83, 84, 85; 425/204

(56) References Cited

U.S. PATENT DOCUMENTS

| | | | |
|---|---|---|---|
| 3,590,429 | * | 7/1971 | Homberg et al. . |
| 3,910,316 | * | 10/1975 | Reifenhauser . |
| 3,970,113 | * | 7/1976 | Guttinger et al. . |
| 4,117,583 | * | 10/1978 | Gnadig et al. . |
| 4,590,033 | * | 5/1986 | Chapet . |
| 5,110,284 | * | 5/1992 | Dienst et al. . |

\* cited by examiner

*Primary Examiner*—David P. Bryant
(74) *Attorney, Agent, or Firm*—Bacon & Thomas, PLLC

(57) ABSTRACT

A method for making an 8-shaped hole in a bimetallic sleeve, including the steps of preparing two bimetallic tubes, each tube having substantially the same dimension; and also preparing a rear sleeve part, and a front sleeve part; fixing each tube with a plurality of clamping blocks having openings on one side; moving each clamped bimetal tube to a thread cut machine, adjusting the spindle of the thread cut machine to move parallel to the openings on one side of the clamping blocks, and then cutting the clamped tube to form a tube of C-shaped cross section; detaching said tube of C-shaped cross section from said plurality of clamping blocks, and clamping two of said tube of C-shaped cross section together with two fixtures having an 8-shaped cross section; applying spot welding at joints of said two tubes of C-shaped cross section for 6–8 spots to form an 8-shaped hole bushing, and then detaching said two fixtures of 8-shaped cross section; heating the rear sleeve part in a heating furnace for 3–5 hours to reach a temperature of 300–400° C. and a thermal expansion of 0.3–0.5 mm, and then inserting the 8-shaped bushing into the expanded rear sleeve part; and fastening the front sleeve part to the rear sleeve part.

4 Claims, 9 Drawing Sheets

Fig 2A
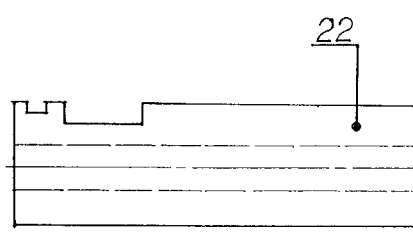
22
Fig 2B
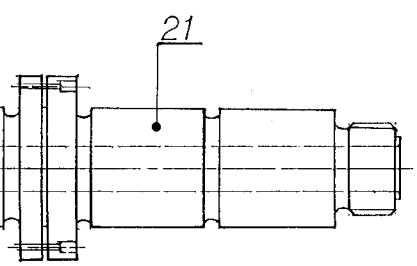
21
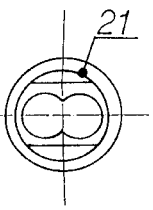
21
Fig 2C
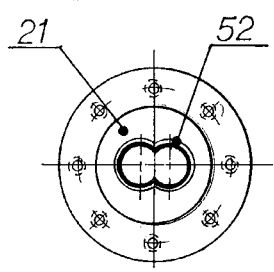
21    52
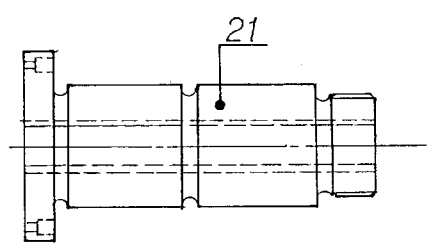
21

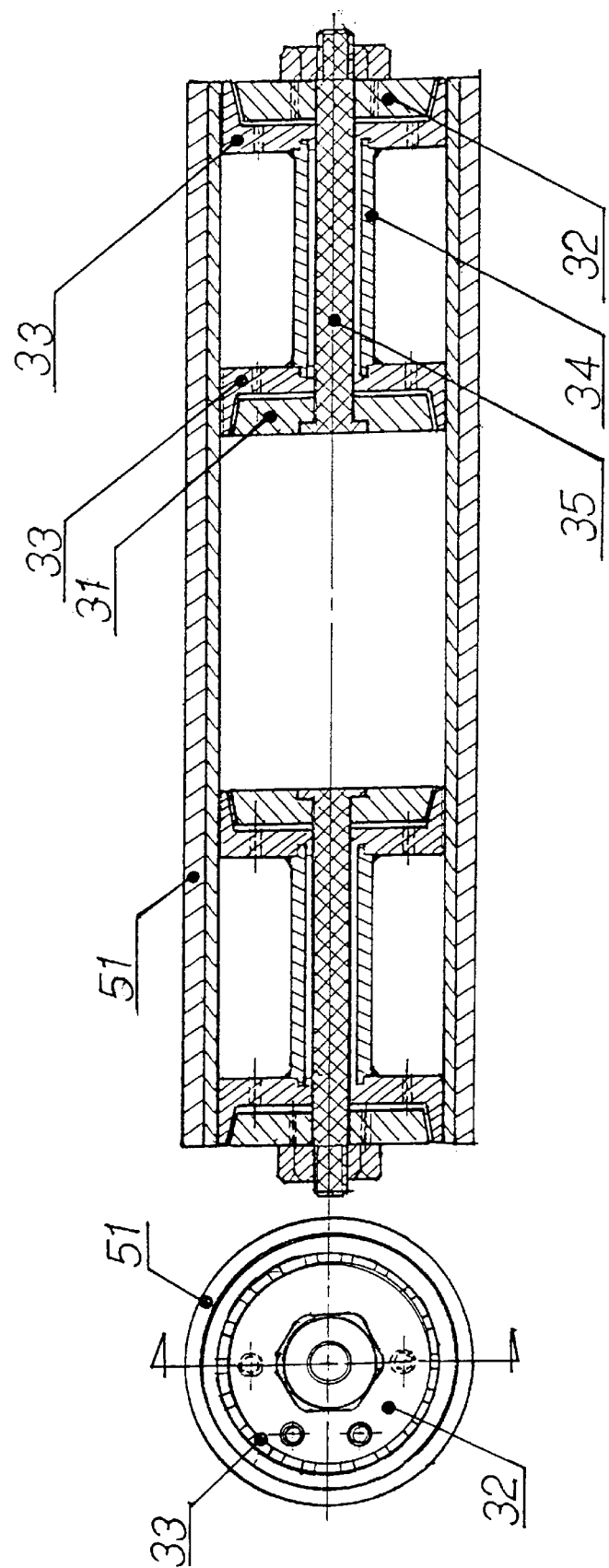

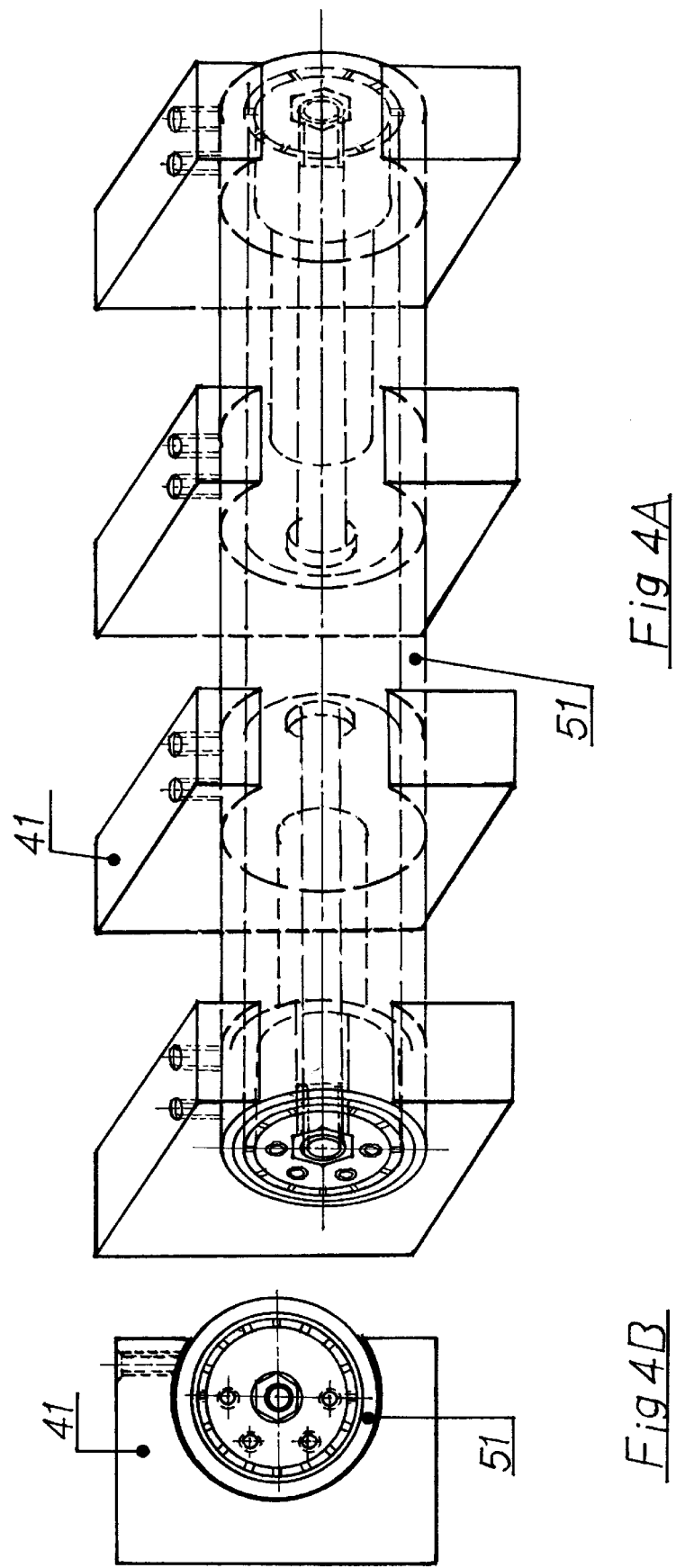

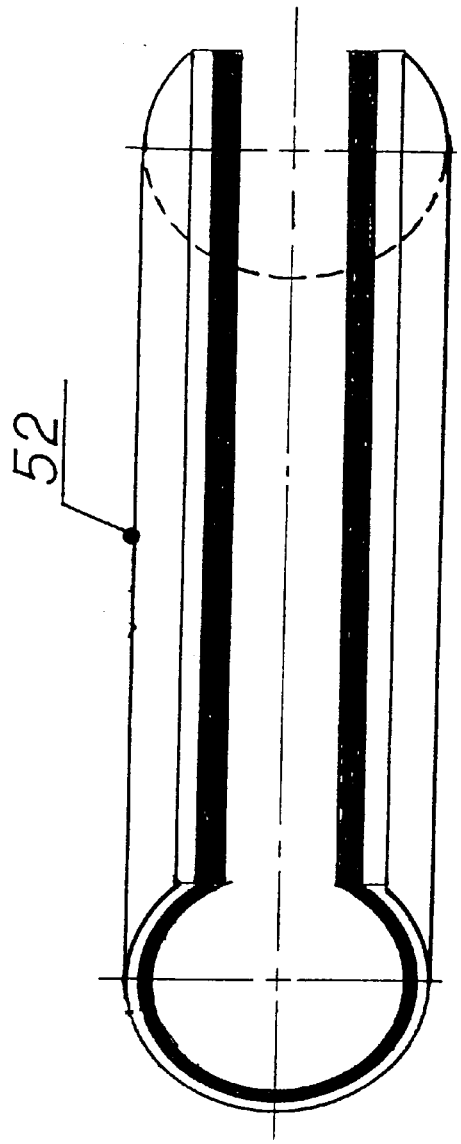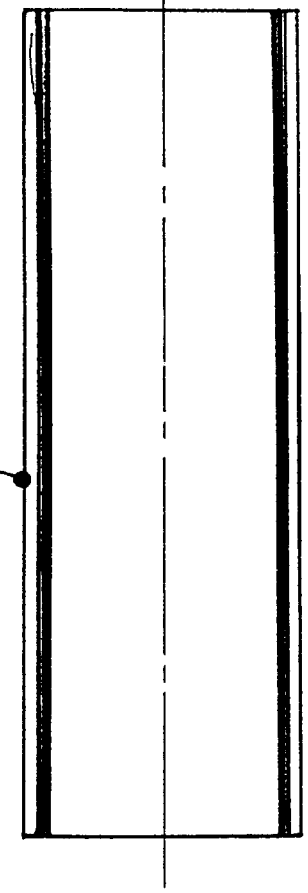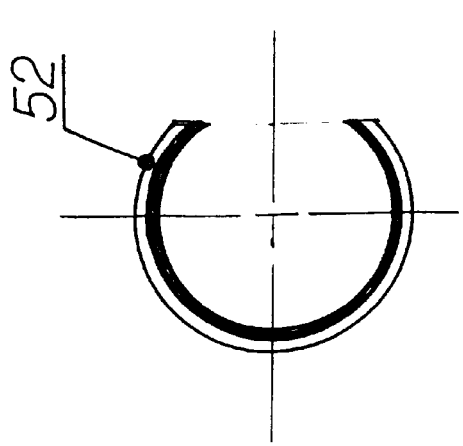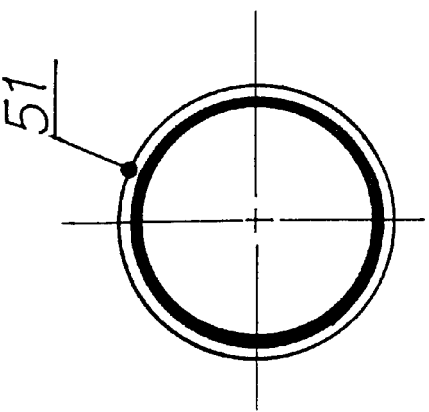

METHOD FOR MAKING AN EXTRUDER SLEEVE

BACKGROUND OF THE INVENTION

1. Field of the Invention

The present invention generally relates to a method of making an extruder sleeve, and, more particularly, to a method for making a dual straight-hole sleeve which has a bimetallic inner bushing and two outer sleeve parts.

2. Description of Related Art

A conventional extruder sleeve with a dual straight-hole design is shown in FIGS. 1A and 1B. It is integrally made as a single piece, with an inner surface having a hardened layer of 0.3–0.6 mm treated by nitridation. Because the hardened layer is only 0.3–0.6 mm, it is easily worn out by the extruded plastic material in the extruder. Therefore, conventional extruder sleeves have inadequate wear resistance and low durability.

SUMMARY OF THE INVENTION

The present disclosure is directed to a method of making a dual straight-hole extruder sleeve which includes a front sleeve part, a bimetallic inner bushing, and a rear sleeve part. Briefly, the method proceeds as follows: (1) prepare two bimetallic tubes having the same dimensions, and also prepare a rear sleeve part and a front sleeve part; (2) fix each tube at its outer surface along the longitudinal axis thereof with clamping blocks that are arranged parallel to one another; (3) adjust each clamped tube on a standard level bench, and then fasten the clamping blocks to the bench so that each tube is clamped tightly; (4) insert inner support tools in each tube for supporting the tube against external forces; (5) move each clamped tube to a thread cutting machine and adjust the spindle of the thread cutting machine to move parallel to the openings on one side of the clamping blocks, and then cut the clamped tube longitudinally to form a tube of C-shaped cross section; (6) apply a plane grinder to the rough surfaces cut on each tube of C-shaped cross section in order to achieve desired roughness; (7) detach each ground tube of C-shaped cross section from the clamping blocks and the inner support tools, and clamp the two tubes of C-shaped cross section together in a fixture having an 8-shaped cross section; (8) apply spot welding to join the two tubes of C-shaped cross section and form an 8-shaped hole bushing, and then detach the fixture; (9) remove any projections on the dual inner bushing tube caused by the spot welding process; (10) heat the rear sleeve part in a heating furnace at 300–400° C. for three to five hours in order to thermally expand the rear sleeve part, and then insert the 8-shaped hole bushing into the expanded rear sleeve part; and (11) finally, fasten the front sleeve part to the rear sleeve part.

The extruder sleeve made by the present invention provides higher wear resistance and durability than conventional extruder sleeves.

An object of the present invention is to provide a method for making a bimetallic 8-shaped hole extruder sleeve which has good wear resistance and durability.

BRIEF DESCRIPTION OF THE DRAWINGS

The present invention can be more fully understood by reference the following description and accompanying drawings, in which:

FIG. 2A is a plan view of a sleeve of dual straight-hole design made by the disclosed method;

FIG. 2B is a side view of the right end of the rear sleeve shown in FIG. 2A;

FIG. 2C is a left side view of the rear sleeve shown in FIG. 2A;

FIG. 3A is a sectional view of a bimetallic tube with two inner support tools therein;

FIG. 3B is a side view of the tube in FIG. 3A;

FIG. 4A is a schematic perspective view of a bimetallic tube fixed by clamping blocks;

FIG. 4B is a sectional view of a clamping block fixing the bimetallic tube in FIG. 4A;

FIG. 5A is a perspective view of a cut bimetallic tube;

FIG. 5B is a side view of the tube in FIG. 5A;

FIG. 5C is a sectional view of a bimetallic tube before being cut;

FIG. 5D is a side view of the tube shown in FIG. 5C;

DETAILED DESCRIPTION OF THE PREFERRED EMBODIMENTS

Figure 1B:
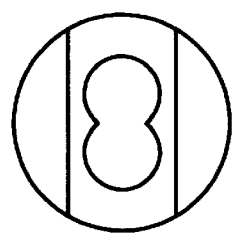
FIG. 1B is a side view of the right end of the conventional sleeve shown in FIG. 1.
Figure 1A:
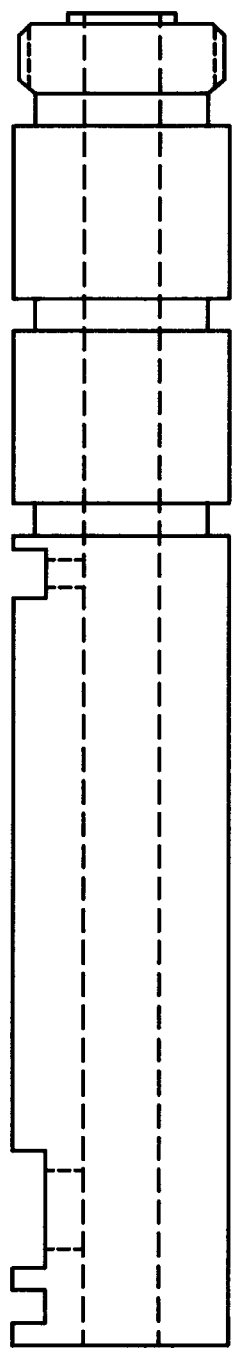
FIG. 1A is a plan view of a conventional extruder sleeve of dual straight-hole design.

Referring to FIGS. 2A, 2B and 2C, an 8-shaped hole extruder sleeve made by a method of the present invention includes a rear sleeve part 21, a front sleeve part 22, and a bimetallic inner bushing tube 52. The rear sleeve part 21 and the front sleeve part 22 have flanged ends for fastening together with bolts. The bimetallic inner bushing tube 52, the rear sleeve part 21, and the front sleeve part 22 are provided with a dual straight-hole configuration. The inner bushing 52 is tightly fit into the rear sleeve part 21.

The method of making such an extruder sleeve includes several steps described in more detail below.

(1) Prepare two bimetallic tubes having the same dimensions, a rear sleeve part, and a front sleeve part:

As shown in FIGS. 5C and 5D, the bimetallic tubes 51, 52 have two layers of material. The outer layer is made of steel and the inner layer is made of hard material with high wear resistance, such as nickel, chromium, or cooper.

(2) Fix each bimetallic tube with clamping blocks:

Referring to FIG. 4A, the bimetallic tube 51 is attached by four identical clamping blocks 41 which are parallel to one another. Each of the clamping blocks has a hollow space and an opening at a lateral side thereof for receiving the tube.

(3) Adjust each of the clamped bimetallic tubes on a standard level bench, and then fasten the clamping blocks to the bench to assure that each tube is clamped tightly:

Each of the clamped tubes is put on a standard level bench in a horizontal position. Then, as shown in FIG. 4B, each tube 51 is clamped tightly by means of fastening bolts in threaded holes at the upper side of the lower side of each clamping block 41.

(4) Insert inner support tools in each end of the clamped tubes to support the inner surface of each of the tubes against external forces:

Referring to FIG. 3A and 3B, an inner support tool at the right end of the bimetallic tube 51 includes a left press plate 31, a right press plate 32, two support plates 33, and a fixing tube 34. The two support plates 33 are fixed to each end of the fixing tube 34, respectively. Each of the support plates has a ring border which contacts with the inner surface of the bimetal tube 51. A stud 35 passes through the fixing tube 34 and carries the left press plate 31 at one end. The other end of the stud 35 extends out of the right press plate 32 and is fastened by a nut. The inner support tool is installed in both ends of the tube 51 to prevent the tube from deforming under external forces. Furthermore, the installation of inner support tools also helps avoid displacement of the tube 51 due to a loosening of the clamping blocks 41.

(5) Move each clamped tube to a thread cutting machine, adjust the spindle of the thread cutting machine to move parallel to the openings on one side of the clamping blocks, and then cut the clamped tube to form a tube of C-shaped cross section:

As shown in FIG. 5A and 5B, the bimetallic tube has been cut to form a C-shaped cross section 52. It is noted that in order to locate the preset cutting point, a radial distance between the longitudinal axis of the clamped tube and the preset cutting point on the outer surface must be determined in advance.

(6) A plane grinder is applied to the surfaces cut on each tube of C-shaped cross section to achieve desired roughness and position parallel to lower sides of the clamping blocks.

The surfaces cut on each tube of C-shaped cross section is ground to a roughness below 0.8 S and parallel to lower sides of the clamping blocks.

(7) Detach each tube of C-shaped cross sections from the clamping blocks and remove the inner support tools. Then, clamp the two tubes together with fixtures having an 8-shaped cross section.

Figure 6:
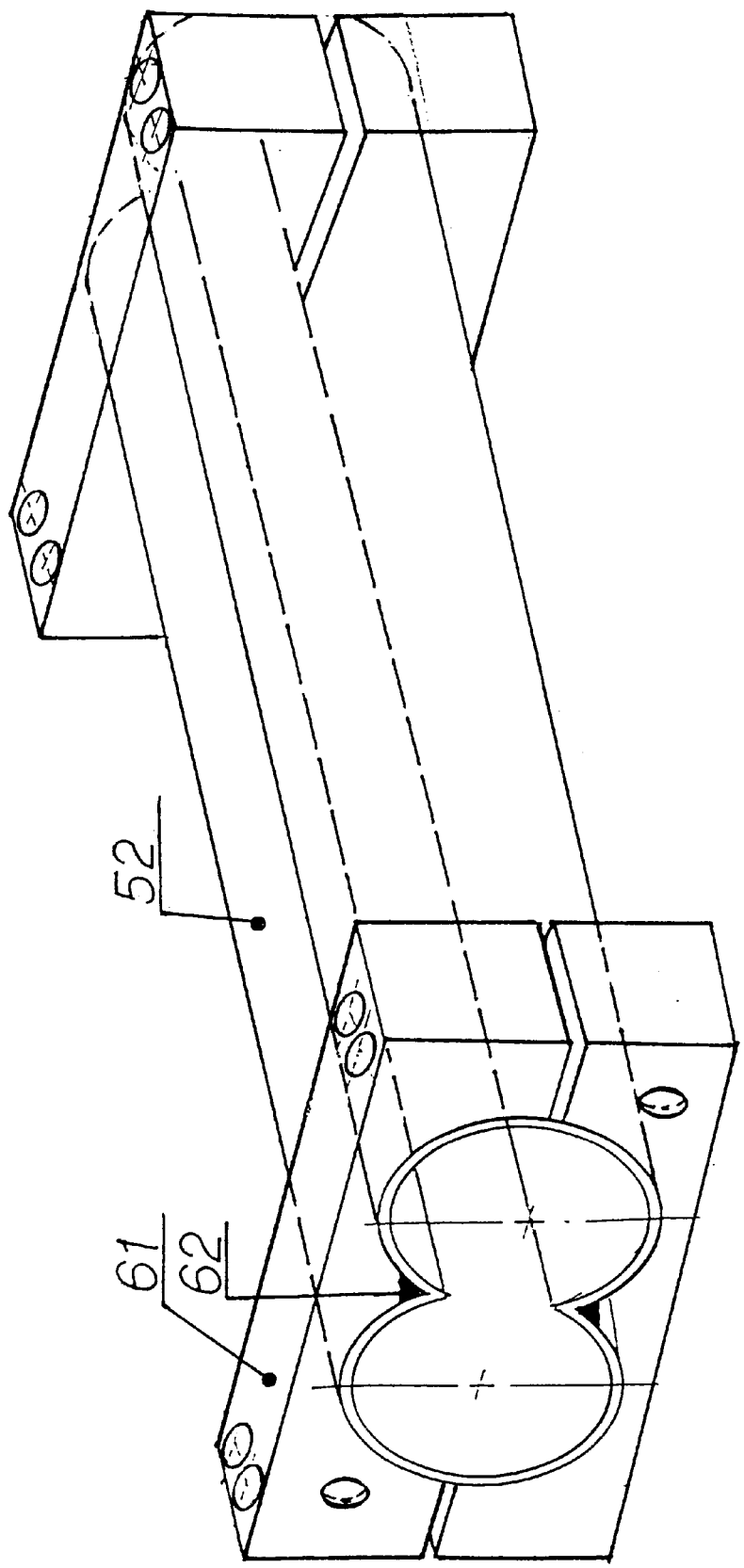
FIG. 6 is a perspective view of two bimetallic tubes with a C-shaped cross section that are clamped together by a fixture of 8-shaped cross section at each end.

Referring to FIG. 6, two tubes of C-shaped cross section 52 are put together using fixtures having an 8-shaped cross section 61 arranged at each end of the tubes 52. The fixed tubes are then adjusted to be parallel within 0.05 mm before fastening the fixtures of 8-shaped cross section.

(8) Apply spot welding at the joints of the two tubes of C-shaped cross section in six to eight spots 62 to form a 8-shaped straight-hole bushing, and then detach the fixtures of 8-shaped cross section.

(9) Remove projections on the 8-shaped hole bushing created during spot welding.

Figure 7:
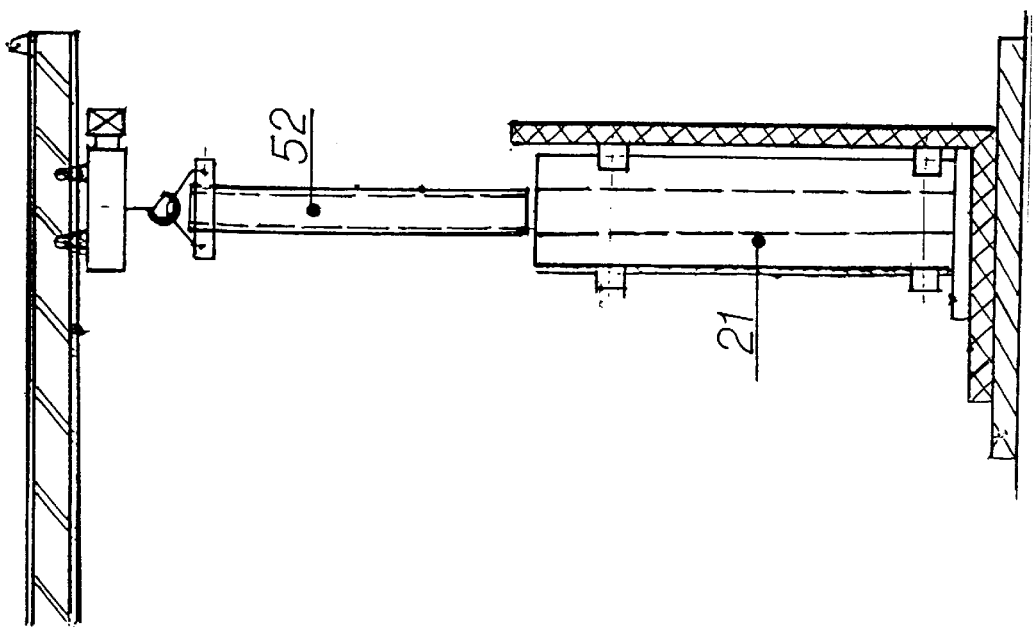
FIG. 7 is schematic diagram illustrating an 8-shaped bushing being inserted into the rear sleeve part.

(10) Heat the rear sleeve part in a heating furnace for three to five hours at a temperature of 300–400° C. resulting in a thermal expansion of 0.3–0.5 mm, and then insert the 8-shaped hole bushing into the expanded rear sleeve part:

As shown in FIG. 7, the 8-shaped hole bushing is inserted into the rear sleeve part 21. It is noted that in order to make the insertion job possible, the 8-shaped hole size of the expanded rear sleeve part has to be 0.2–0.4 mm larger than the outer size of the 8-shaped hole bushing.

(11) Finally, fasten the front sleeve part to the rear sleeve part.

In addition, if one of the tubes of C-shaped cross section is deformed after detaching the clamping blocks and the inner support tools during step (7), the deformation has resulted from an internal stress generated in the tube during the cutting process for forming a tube of C-shaped cross section. The deformed tube usually has an oval, shrunk oval, or expanded oval cross section that must then be corrected, or repaired.

The correcting step includes installing the inner support tools back inside the deformed tube to expand the deformed tube to the required size, putting the deformed tube in a, correct, or repair tool, and leaving repair tool with the deformed tube in a heating furnace at a temperature of 500–600° C. for four to six hours to correct the deformed tube. Then, the repair tool is removed after cooling down in the furnace and the repair tool and the inner support tools are detached.

Figure 8:
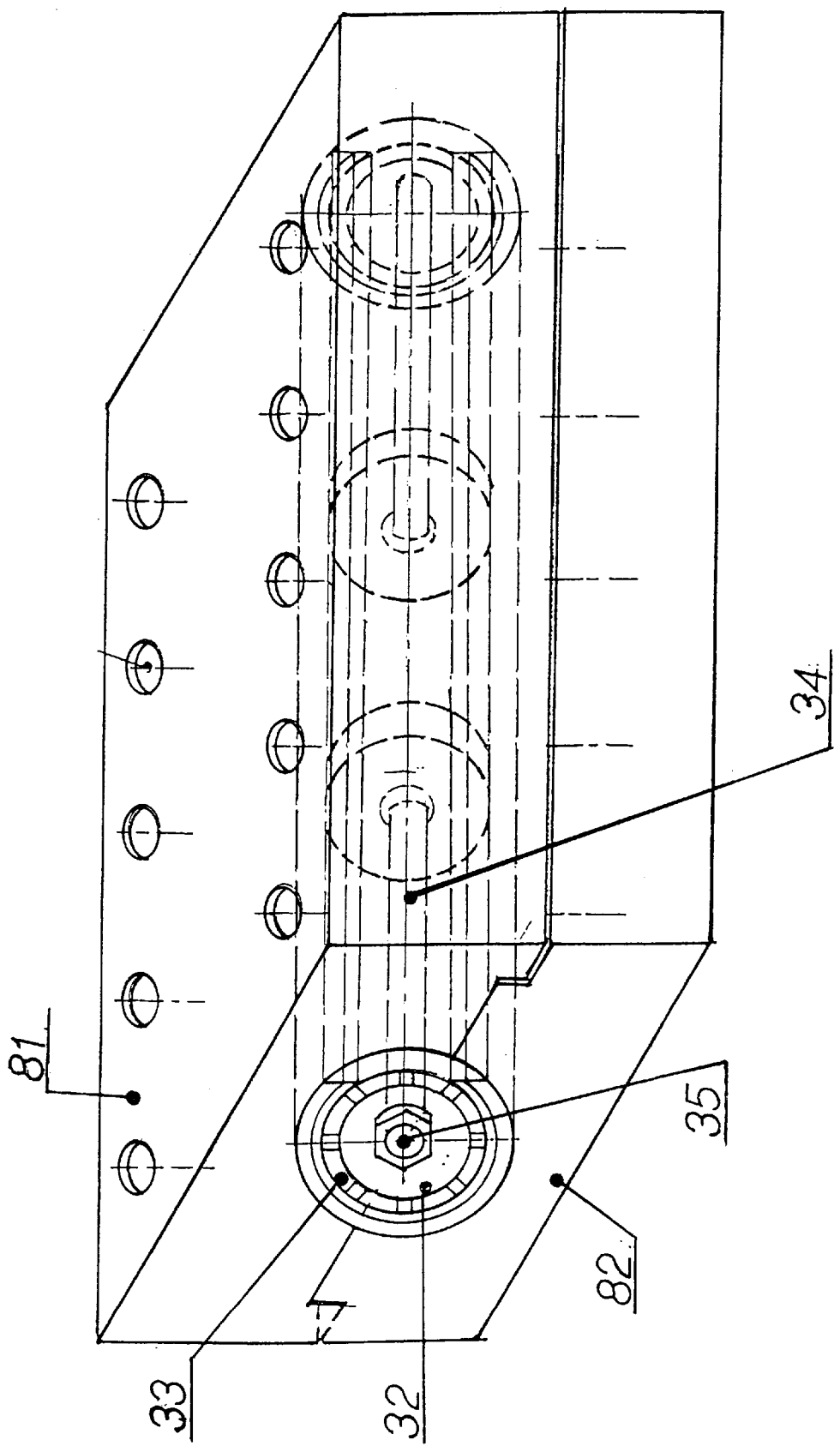
FIG. 8 is a perspective view of a bimetallic tube covered by a repair tool and with inner support tools therein.

Referring to FIG. 8, the repair tool includes a base plate 82 with a semicircular groove and a cove plate 81 with another semicircular groove. The deformed tube is laid in the semicircular groove on the base plate 82 and the semicircular groove on the cover plate 81 is pressed against the deformed tube. The cover plate 81 and the base plate 82 are then fastened together by bolts. Once the deformed tube has been properly corrected or repaired, the repair tool is detached and the method continues at step (7).

Figure 9:
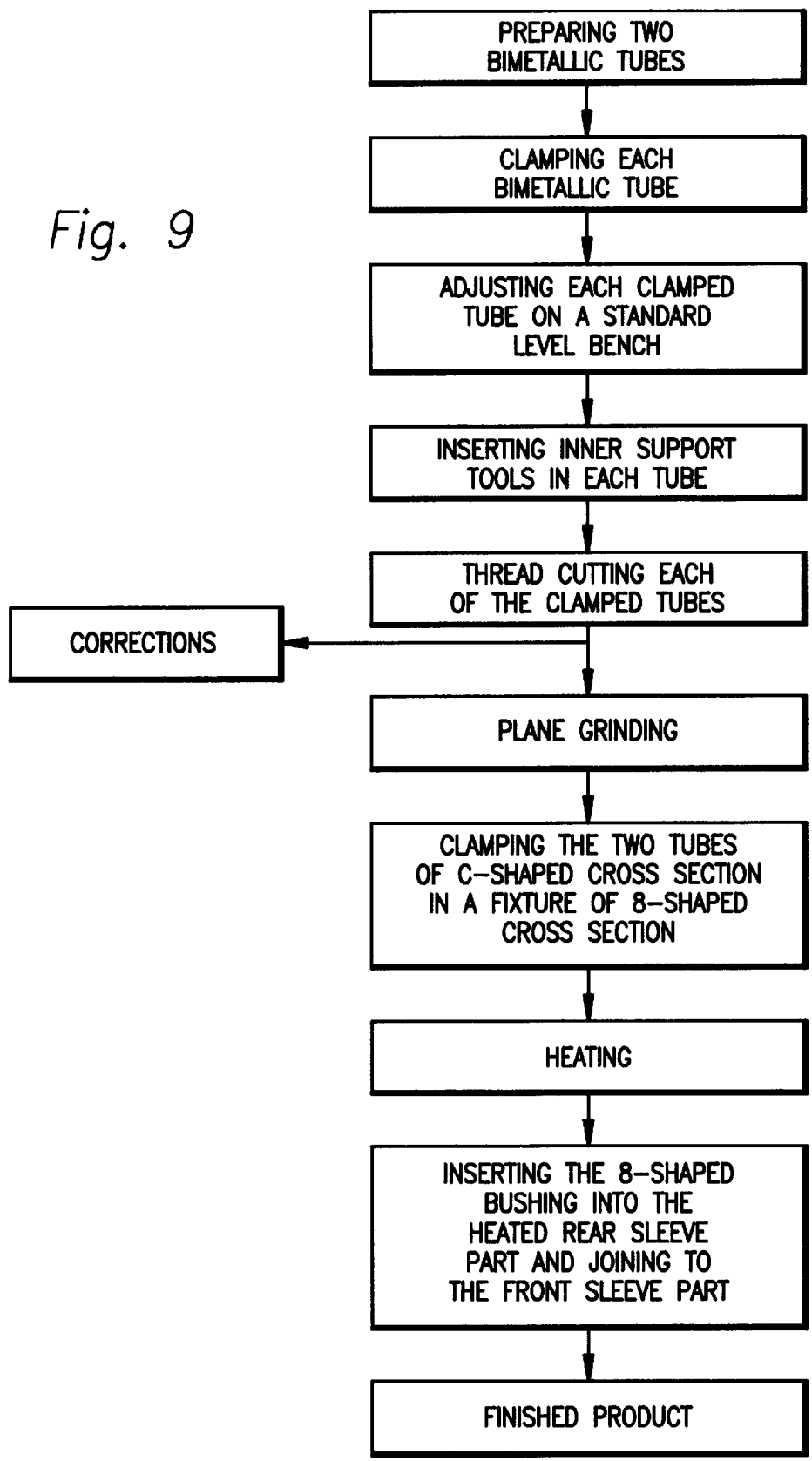
FIG. 9 is a flow diagram of the method disclosed in the present invention.

To summarize the above description, a flow diagram is shown in FIG. 9. It is clear that the method disclosed in the present invention can be simply accomplished based on the flow diagram.

While the invention has been described with reference to the preferred embodiment thereof, it is to be understood that modifications and variations may be easily made without departing from the scope of this invention defined by the appended claims.

What is claimed is:

1. A method of making a bimetallic extruder sleeve, comprising the following steps:

(a) preparing two bimetallic tubes, each tube having substantially the same dimensions; and also preparing a rear sleeve part, and a front sleeve part;

(b) fixing each tube with a plurality of clamping blocks having openings on one side;

(c) adjusting each of the clamped tubes on a standard level bench, and then fastening said plurality of clamping blocks to the bench with each tube clamped tightly in the clamping blocks;

(d) inserting two inner support tools in each of the tubes at each end thereof for supporting the inner surface of each of the tubes against external forces;

(e) moving each clamped bimetal tube to a thread cut machine, adjusting the spindle of the thread cut machine to move parallel to the openings on one side of the clamping blocks, and then cutting each clamped tube to form a tube of C-shaped cross section;

(f) grinding the surfaces cut on said tubes of C-shaped cross section to a desired roughness in a plane parallel to surfaces at the openings of the clamping blocks;

(g) detaching said tubes of C-shaped cross section from said plurality of clamping blocks and removing said inner support tools, and clamping said two tubes of C-shaped cross section together with two fixtures having an 8-shaped cross section;

(h) applying spot welding at junctions of said two tubes of C-shaped cross section for 6–8 spots to form an 8-shaped bushing, and then detaching said two fixtures of 8-shaped cross section;

(i) removing projections on the 8-shaped bushing caused by the spot welding;

(j) heating the rear sleeve part in a heating furnace for 3–5 hours to reach a temperature of 300–400° C. and a thermal expansion of 0.3–0.5 mm, and then inserting the 8-shaped bushing into the expanded rear sleeve part; and (k) fastening the front sleeve part to the rear sleeve part.

2. The method according to claim 1, wherein a deformed tube is generated in step (g), further comprising the steps of:

installing the inner support tools back into the deformed tube to expand the deformed tube;

putting the deformed tube in a repair tool and leaving the repair tool with the deformed tube in a heating furnace at a temperature of 500–600° C. for 4–6 hours to correct the deformed tube; and removing the repair tool after cooling down in the furnace and detaching the repair tool and the inner support tools from the tube.

3. The method according to claim 1 wherein the front and rear sleeves include flanges which are fastened by bolts.

4. The method according to claim 1 wherein the outer bimetallic layer is steel and the inner bimetallic layer is selected from the group consisting of nickel, chromium, or copper.

* * * * *